United States Patent
Conlin et al.

(10) Patent No.: US 9,680,837 B2
(45) Date of Patent: *Jun. 13, 2017

(54) SYSTEMS AND METHODS FOR ACCESS CONTROL

(71) Applicant: XceedID Corporation, Golden, CO (US)

(72) Inventors: Michael T. Conlin, Superior, CO (US); Jean-Hugues Wendling, Denver, CO (US)

(73) Assignee: XceedID Corporation, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/174,419

(22) Filed: Jun. 6, 2016

(65) Prior Publication Data

US 2016/0285879 A1    Sep. 29, 2016

Related U.S. Application Data

(63) Continuation of application No. 14/529,754, filed on Oct. 31, 2014, now Pat. No. 9,361,740, which is a continuation of application No. 13/776,971, filed on Feb. 26, 2013, now abandoned, which is a continuation of application No. 12/943,902, filed on (Continued)

(51) Int. Cl.
*G06F 7/04* (2006.01)
*H04L 29/06* (2006.01)
*G05B 1/01* (2006.01)
*G07C 9/00* (2006.01)

(Continued)

(52) U.S. Cl.
CPC ............... *H04L 63/10* (2013.01); *G05B 1/01* (2013.01); *G07C 9/00007* (2013.01); *G07C 9/00111* (2013.01); *H04L 9/3215* (2013.01); *H04L 9/3234* (2013.01); *H04L 63/08* (2013.01);

(Continued)

(58) Field of Classification Search
CPC .... H04W 12/06; H04W 4/0008; G06Q 20/32; G06Q 20/3278; G06Q 20/3674
See application file for complete search history.

(56) References Cited

U.S. PATENT DOCUMENTS 4,752,776 A    6/1988   Katzenstein
5,041,826 A    8/1991   Milheiser
(Continued)

FOREIGN PATENT DOCUMENTS

EP    1379052    1/2004

OTHER PUBLICATIONS

"Skyetek RFID Readers," Data Sheet, Jul. 4, 2003 (1 page).
(Continued)

*Primary Examiner* — George Bugg
*Assistant Examiner* — Renee Dorsey
(74) *Attorney, Agent, or Firm* — Michael Best & Friedrich LLP

(57) ABSTRACT

The disclosure describes various systems and methods for access control. One such method includes providing an access control module that includes a base portion and an update portion. The update portion is electrically coupled to the base portion via a detachable electrical connector, and wherein operation of the access control module is based at least in part on an interaction between the base portion and the update portion.

16 Claims, 7 Drawing Sheets

Related U.S. Application Data

Nov. 10, 2010, now Pat. No. 9,142,069, which is a continuation of application No. 12/691,726, filed on Jan. 21, 2010, now Pat. No. 8,407,775, which is a continuation of application No. 11/076,090, filed on Mar. 8, 2005, now Pat. No. 7,676,839.

(60) Provisional application No. 60/553,685, filed on Mar. 15, 2004, provisional application No. 60/553,677, filed on Mar. 15, 2004.

(51) Int. Cl.
*H04L 9/32* (2006.01)
*H04W 12/08* (2009.01)

(52) U.S. Cl.
CPC ........ *H04W 12/08* (2013.01); *G07C 2209/61* (2013.01); *H04L 2209/80* (2013.01)

(56) References Cited

U.S. PATENT DOCUMENTS

| | | | |
|---|---|---|---|
| 5,166,676 A | 11/1992 | Milheiser | |
| 5,235,326 A | 8/1993 | Beigel et al. | |
| 5,638,056 A | 6/1997 | Nakashima et al. | |
| 5,805,912 A | 9/1998 | Johnson et al. | |
| 5,822,548 A | 10/1998 | Story et al. | |
| 5,903,226 A | 5/1999 | Suman et al. | |
| 5,936,544 A | 8/1999 | Gonzales et al. | |
| 6,377,173 B1 | 4/2002 | Desai | |
| 6,611,198 B1 | 8/2003 | Geiszler et al. | |
| 6,661,335 B1 | 12/2003 | Seal | |
| 6,750,771 B1 | 6/2004 | Brand | |
| 6,865,232 B1 | 3/2005 | Isaksson et al. | |
| 6,880,155 B2 | 4/2005 | Schwabe et al. | |
| 6,888,459 B2 | 5/2005 | Stilp | |
| 6,963,267 B2 | 11/2005 | Murray | |
| 7,005,985 B1 | 2/2006 | Steeves | |
| 7,019,639 B2 | 3/2006 | Stilp | |
| 7,023,341 B2 | 4/2006 | Stilp | |
| 7,106,170 B2 | 9/2006 | Wang | |
| 7,119,738 B2 | 10/2006 | Bridgelall et al. | |
| 7,142,090 B2 | 11/2006 | Ueda et al. | |
| 7,173,514 B2 | 2/2007 | Mullet et al. | |
| 7,230,518 B2 | 6/2007 | Fitzgibbon | |
| 7,268,687 B2 | 9/2007 | Egbert et al. | |
| 7,321,300 B2 | 1/2008 | Friedrich et al. | |
| 7,376,425 B2 | 5/2008 | Laroia et al. | |
| 7,439,862 B2 | 10/2008 | Quan | |
| 7,573,857 B1 | 8/2009 | Radhakrishnan et al. | |
| 7,589,615 B2 | 9/2009 | Keller, Jr. et al. | |
| 7,676,839 B2 | 3/2010 | Conlin et al. | |
| 7,900,253 B2 | 3/2011 | Wendling et al. | |
| 2001/0025879 A1 | 10/2001 | Kawagishi | |
| 2001/0045454 A1 | 11/2001 | Gangi | |
| 2002/0030099 A1 | 3/2002 | Sakashita et al. | |
| 2002/0087868 A1 | 7/2002 | King et al. | |
| 2002/0147792 A1 | 10/2002 | Harrison et al. | |
| 2002/0183008 A1 | 12/2002 | Menard et al. | |
| 2003/0046541 A1 | 3/2003 | Gerdes et al. | |
| 2003/0048174 A1 | 3/2003 | Stevens et al. | |
| 2003/0088868 A1 | 5/2003 | Chang et al. | |
| 2003/0098779 A1 | 5/2003 | Taylor et al. | |
| 2003/0150915 A1 | 8/2003 | Reece | |
| 2004/0056758 A1 | 3/2004 | Schwartz | |
| 2004/0125013 A1 | 7/2004 | Haselsteiner et al. | |
| 2004/0215964 A1 | 10/2004 | Barlow et al. | |
| 2004/0268132 A1 | 12/2004 | Waris | |
| 2005/0044387 A1* | 2/2005 | Ozolins | G06F 1/00 713/186 |
| 2005/0184854 A1 | 8/2005 | Mullet et al. | |
| 2006/0084439 A1 | 4/2006 | Joshi et al. | |
| 2006/0206927 A1 | 9/2006 | Wendling et al. | |
| 2006/0223453 A1 | 10/2006 | Griffin et al. | |
| 2006/0224901 A1 | 10/2006 | Lowe | |
| 2006/0283958 A1 | 12/2006 | Osterweil | |
| 2006/0290502 A1 | 12/2006 | Rawlings | |
| 2007/0008140 A1 | 1/2007 | Saaisalo et al. | |
| 2007/0057057 A1 | 3/2007 | Andresky et al. | |
| 2007/0246546 A1 | 10/2007 | Yoshida | |
| 2012/0051279 A1 | 3/2012 | Li et al. | |
| 2012/0236829 A1 | 9/2012 | Takano et al. | |

OTHER PUBLICATIONS

Armouche, H., Non-Final Rejection in U.S. Appl. No. 11/076,541, mailed Sep. 8, 2008 (9 pages).
Hamilton, D. M., Amendment and Response to U.S. Appl. No. 11/076,541, filed Dec. 1, 2008 (10 pages).
Armouche, H., Final Rejection in U.S. Appl. No. 11/076,541, mailed Dec. 12, 2008 (10 pages).
Hamilton, D. M., Amendment and Response to U.S. Appl. No. 11/076,541, filed Jan. 9, 2009 (11 pages).
Simitoski, J. J., Non-Final Office Action in U.S. Appl. No. 11/193,703, mailed Jan. 16, 2009 (11 pages).
Armouche, H., Advisory Action in U.S. Appl. No. 11/076,541, mailed Jan. 27, 2009 (3 pages).
Hamilton, D. M., Supplemental Amendment and Response to U.S. Appl. No. 11/076,541, filed Feb. 12, 2009 (7 pages).
Armouche, H., Advisory Action in U.S. Appl. No. 11/076,541, mailed Feb. 24, 2009 (3 pages).
Hamilton, D. M., Amendment/Response and RCE in U.S. Appl. No. 11/076,541, filed Apr. 10, 2009 (10 pages).
Hamilton, D. M., Amendment and Response in U.S. Appl. No. 11/193,703, filed Apr. 10, 2009.
Office Action from the United States Patent and Trademark Office for U.S. Appl. No. 12/691,726 dated Jun. 19, 2012 (15 pages).
United States Patent Office Action for U.S. Appl. No. 12/943,902 dated Jun. 5, 2014 (15 pages).

* cited by examiner

SYSTEMS AND METHODS FOR ACCESS CONTROL

BACKGROUND

The present invention is related to systems and methods for providing security, and in particular to systems and methods for controlled access using distributed access control system.

In a typical installation, wireless access to access points in an establishment is provided by installing access control readers in relation to respective doors that are wired to a centralized control station. In such systems, credentials are issued which communicates with the access control readers to provide access with the respective doors. To update access control, the readers are typically replaced with newer models and new credentials are issued for operation in relation to the new readers. This can be a costly undertaking and may require that all issued credentials be gathered and replaced at once. Furthermore, retrofitting existing buildings with access control can be costly where a wired link to the centralized control station is utilized.

Thus, for at least the aforementioned reasons, there exists a need in the art for advanced systems and method for access control. The disclosure describes various systems and methods for access control. One such method includes providing an access control module that includes a base portion and an update portion. The update portion is electrically coupled to the base portion via a detachable electrical connector, and wherein operation of the access control module is based at least in part on an interaction between the base portion and the update portion.

BRIEF SUMMARY

The present invention is related to systems and methods for providing security, and in particular to systems and methods for controlled access using distributed access control system.

One or more embodiments of the present invention provide methods for decentralized access control. Such methods include providing an access control module that is capable of operating at least two carrier frequencies. In addition, two or more access credentials are provided that operate at one or more of the carrier frequencies. In some instances, the access control module includes a base portion and an update portion. The methods may include modifying the functionality of the access control module by replacing the update portion with another update portion. In various instances, the access control module includes a processor and a computer readable medium. In such instances, the computer readable medium includes a set of instructions executable by the processor. In such instances, the methods may include updating the access control module by reprogramming the computer readable medium to include a different set of instructions executable by the processor. This reprogramming may be done by, but is not limited to, wirelessly communicating with the access control module via the first carrier frequency, wirelessly communicating with the access control module via an infrared link, and electrically communicating with the access control module via a wired link.

In some cases, one of the access credentials operates at a carrier frequency or group of carrier frequencies different from that of another provided access credential. In various cases, the access control module is deployed near an access point. Such an access point may be, for example, a door or other apparatus used to control access. In some cases, the access control module is wirelessly coupled to a centralized control system, and the centralized control system indicates a plurality of access credentials that are authorized to access the access point. In one or more cases, the methods effectuate a credential migration. This credential migration may include replacing one provided access credential with another access credential. In other cases, the methods differentiate between authorized access groups by allowing access on one carrier frequency to one group, and on another carrier frequency to another group. In some such cases, credentials operating at one carrier frequency are issued by one entity to the group accessing via the particular carrier frequency, and credentials operating at the other carrier frequency are issued by another entity to the group accessing via the other carrier frequency.

Other embodiments of the present invention provide access control devices. Such access control devices include an access control module with a base portion and an update portion. The update portion is electrically coupled to the base portion via a detachable electrical connector, and operation of the access control module is based at least in part on an interaction between the base portion and the update portion. In some cases, such access control devices can be stand alone devices, while in other cases such access control devices may be communicably coupled to a centralized control system. Further, in some cases the base module may include a flash read only memory that is modifiable when the access controller is deployed local to an access point. In one or more cases, the base portion includes one processor, and the update portion includes another processor. In one particular instance, the base portion includes a processor and a computer readable medium with two or more sets of instructions executable by the processor. The update portion includes a hardware selector that selects between sets of instructions that are executed by the processor.

Yet other embodiments of the present invention provide methods for migrating access control. The methods include providing an access control module that is operable to receive communications at two or more carrier frequencies. The methods further include providing a credential operable to communicate at one carrier frequency to replace an earlier provided credential that operates at a different carrier frequency. In some instances, the access control module includes a base portion and an update portion. The update portions is tailored for operation with a particular credential, and the methods further comprise replacing the update portion with another update portion that is tailored for operation with a replacement credential.

Yet other embodiments of the present invention provide contactless access control systems. Such systems include a modular component group that includes two distinct active components. At least one of the active components implements a battery powered locking system. In some cases, the battery power is used to eliminate the need to provide wired power to the control system. In various cases, one of the active components is fixed in relation to a mounting surface, and the other active component is removable. In one or more cases, the removable active component is replaceable by another active component. In one particular case, the fixed component includes a printed circuit board ("PCB") that is operable to implement wireless access. In some cases, the removable active component may be, but is not limited to, a PCB operable to implement wireless access, a PCB operable to implement a keypad, and a dongle operable to implement infrared communications with the first component.

Yet further embodiments of the present invention provide systems for contactless access control that include a modular component group with two or more sub-components where at least one of the sub-components implements access control in relation to a time and attendance function. In some cases, the time and attendance is related to determining when employees are at work, or students are in school. Other embodiments of the present invention provide contactless access control systems with a modular component group that includes at least two active subcomponents with at least one of the active sub-components implements access control in relation to mechanical tool access control, monitoring and/or security. Additional embodiments of the present invention provide access control systems with a modular component group of two or more active sub-components where at least one of the active sub-components implements access control in relation to industrial vehicle access control, monitoring and/or security.

Yet other additional embodiments of the present invention provide con tactless access control systems including a modular component group with two or more active sub-components. At least one of the active sub-components implements access control in relation to border control, monitoring and/or security. In such systems, the border may be, but is not limited to, a national border, a company border or property boundary, or a logical border such as a group of computers.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 5b is a second portion of the flow diagram of FIG. 5a; and

DETAILED DESCRIPTION

Figure 1:
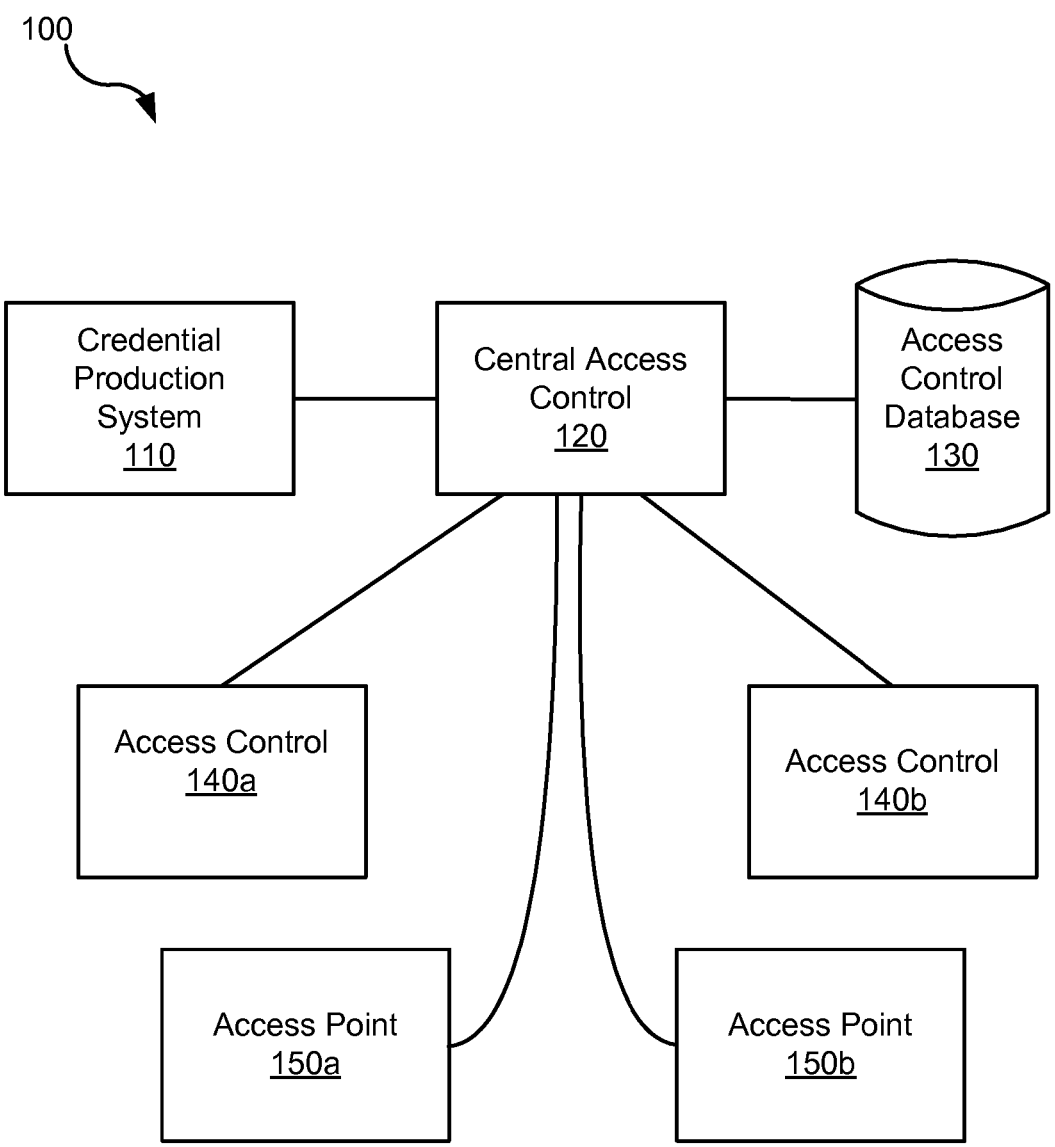
FIG. 1 depicts an access control system known in the art.

The present invention is related to systems and methods for providing security, and in particular to systems and methods for controlled access using distributed access control system.

One or more embodiments of the present invention provide methods for decentralized access control. As used herein, the term "decentralized access control" refers to any access control system where one or more functions of a deployed access control module are not controlled by a centralized access control distribution system, or where the access control module is not wired to a centralized access control distribution system. In some cases, the access control modules are completely stand alone and operate on battery power such that there is no wiring requirement when deploying the access control module. In various cases, the devices may be wirelessly coupled to a centralized system, and operate on battery control. Thus, only minimal installation requirements exist when deploying the access control module.

The aforementioned methods include providing an access control module that is capable of operating at least two carrier frequencies. In addition, two or more access credentials are provided that operate at one or more of the carrier frequencies. As used herein, the term "credential" refers to any portable device that includes information useful in completing a transaction. Thus, for example, a credential may be a smart card with information allowing a user of the credential to access an access point. Such credentials may be, but are not limited to, credit cards, debit cards, access control cards, smart cards, cellular telephones, personal digital assistants, and/or the like. Such credentials may be capable of communicating via a magnetic stripe, a radio frequency interface, a wired interface, an optical interface, and/or the like. Based on the disclosure provided herein, one of ordinary skill in the art will recognize a variety credentials and mechanisms for facilitating communications between credentials and access control modules. As used herein, the term "access credential" is a particular type of credential that is capable of, but not limited to, providing access via an access point.

In some instances of the methods, the access control module includes a base portion and an update portion. As used herein, the term "base portion" is used to mean a part of the access control module that can be mated to another portion of the access control module, and that is generally in a fixed deployment. As used herein, the term "update portion" is used to mean any part of the access control module that can be mated to another portion of the access control module, and that can be removed and replaced with relative ease compared to a corresponding base portion. In some cases, the aforementioned methods include modifying the functionality of the access control module by replacing the update portion with another update portion. Thus, for example, in one particular case, the update portion includes a hardware selector that selects between sets of instructions that are executed by the processor. As another example, the update portion includes a processor and/or a computer readable medium used to affect the operation of the access control module.

In various instances of the aforementioned methods, the access control module includes a processor and a computer readable medium. In such instances, the computer readable medium includes a set of instructions executable by the processor. Such instructions may be formed as, for example, computer executable software. In such instances, the methods may include updating the access control module by reprogramming the computer readable medium to include a different set of instructions executable by the processor. This reprogramming may be done by, but is not limited to, wirelessly communicating with the access control module via the first carrier frequency, wirelessly communicating with the access control module via an infrared link, and electrically communicating with the access control module via a wired link.

In some cases, one of the access credentials operates at a carrier frequency or group of carrier frequencies different from that of another provided access credential. In various cases, the access control module is deployed near an access point. Such an access point may be, for example, a door or other apparatus used to control access. In some cases, the access control module is wirelessly coupled to a centralized control system, and the centralized control system indicates a plurality of access credentials that are authorized to access the access point. In one or more cases, the methods effectuate a credential migration. This credential migration may include replacing one provided access credential with another access credential. In one particular embodiment of the present invention, a control reader in accordance with one or more embodiments of the present invention operates at two distinct carrier frequencies, 125 KHz and 13.56 MHz. This multiple frequency approach may, among other things, provide for transitioning systems from one generation of control to another. Thus, as an example, where access control is initially provided at 125 KHz, new processes of access control can be supported at 13.56 MHz until the new processes of access control are fully implemented and the 125 KHz processes can then be ended.

Other embodiments of the present invention provide access control devices. Such access control devices include an access control module with a base portion and an update portion. The update portion is electrically coupled to the base portion via a detachable electrical connector, and operation of the access control module is based at least in part on an interaction between the base portion and the update portion. In some cases, such access control devices can be stand alone devices, while in other cases such access control devices may be communicably coupled to a centralized control system. For purposes of this document, the term "communicably coupled" is used in its broadest sense to mean any coupling or link between two endpoints that allows for communication there between. Thus, for example, communicably coupling may include, but is not limited to, a contactless coupling such as a radio frequency, sound or optical link; a physical link such as a wired link; and/or the like.

Turning to FIG. 1, a known access control system 100 is illustrated. System 100 includes access control devices 140 associated with respective access points 150, and electrically wired to a central access control 120. When access point 150 is to be opened, access control device 140 sends an electrical signal to operate the associated actuator. Further, system 100 includes a central access control 120 wired to the access control devices 140 and access points 150. Central access control 120 is associated with a credential production system 110 that is capable of creating one or more credentials capable of actuating one or more access controls 140. This programming is done based on information from an access control database 130. In a typical scenario, central access control 120, credential production system 110, and access control database 130 are maintained by the security department of a company. The security department maintains access control database 130 as a list of all personnel authorized to enter company premises. A personnel may report to the security department and request an appropriate access credential. The access information associated with the person is gathered from access control database 130 and programmed into a blank access credential using access credential production system 110. This programmed access credential can then be used by the person to access one or more of access points 150 through presentation to respective access control devices 140.

Figure 2:
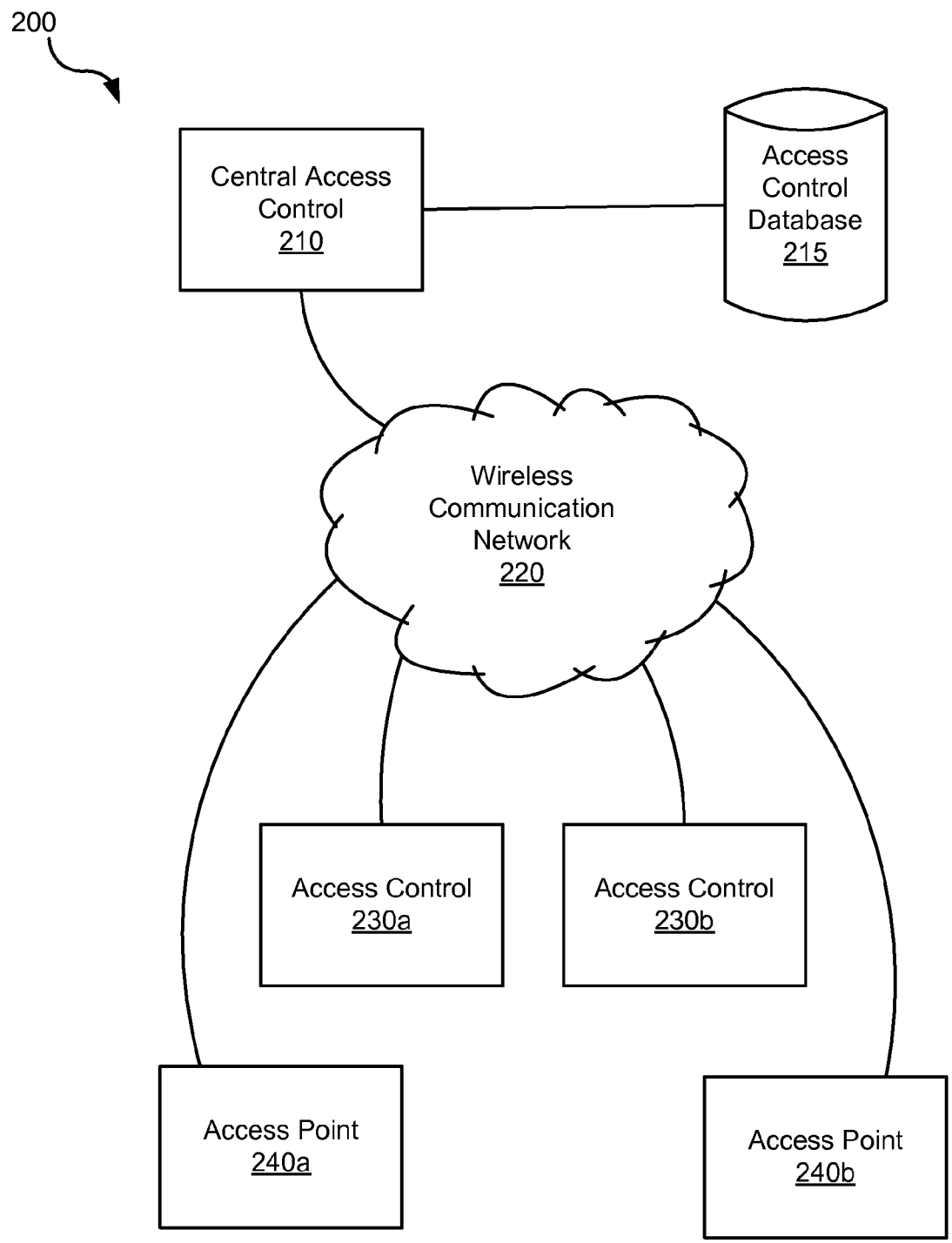
FIG. 2 illustrates an access control system in accordance with one or more embodiments of the present invention.

Turning to FIG. 2, an access control system 200 in accordance with one or more embodiments of the present invention is described. Access control system 200 includes a central access control device 210 that is communicably coupled to one or more access control modules 230 and/or access points 240 via a wireless communication network 220. Wireless communication network 220 may be any type communication network that does not require an electrical connection physically connecting central access control device 210 with access control modules 230. In operation, a user presents a credential to one of access control modules 230 that in turn actuate a locking mechanism associated with respective access points 240 to allow access via the access point. In some cases, information derived from the credential by the access control module is transferred to central access control device 210 where a look up function is performed. This lookup function includes accessing an access control database 215 to determine whether a credential presented at a given access control module 140 is authorized for accessing the access point 240 associated with the access control module 140. A message indicating the authorization status may be sent from the central access control 210 to the accessed access control module 140. Where the authorization is positive, the access point 150 associated with the access control module 140 is opened to allow access.

Figure 3:
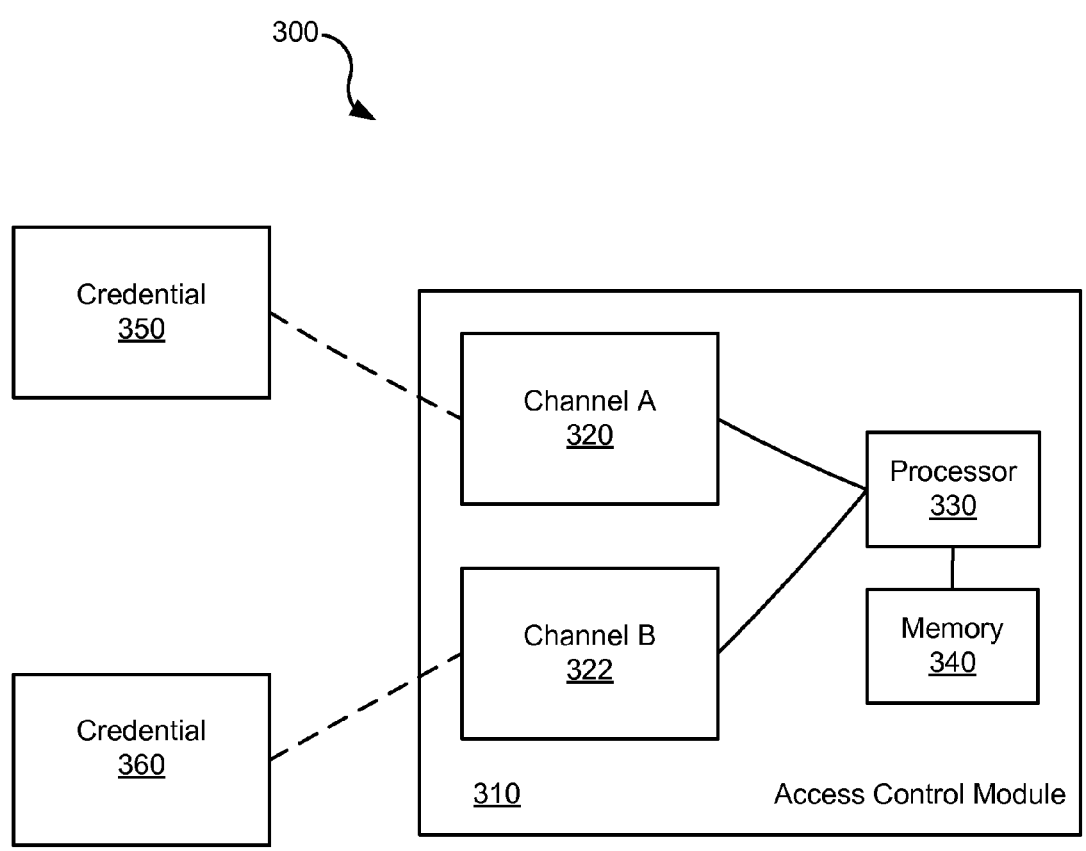
FIG. 3 illustrates an access control grouping in accordance with one or more embodiments of the present invention.

Turning to FIG. 3, an access control grouping 300 in accordance with one or more embodiments of the present invention is presented. Grouping 300 includes an access control module 310 capable of querying various credentials 350, 360 at different carrier frequencies. In operation, a credential 350 transmits information to access control module 310. This information is received at a receiver that determines the carrier frequency at which credential 350 is transmitting. In this case, it is a carrier frequency associated with a channel A 320 of access control module 310. Channel A 320 syncs to the incoming information and passes at least portions of the information to a processor 330 executing instructions retrieved from memory 340. Where the information is sufficient to authorize access, access control module 310 actuates an access point to which it is associated.

Similarly, when credential 360 is presented, access control module 310 determines the carrier frequency at which credential 360 is transmitting. In this case, it is a carrier frequency associated with a channel B 322 of access control module 310. Channel B 322 syncs to the incoming information and passes at least portions of the information to processor 330. Where the information is sufficient to authorize access, access control module 310 actuates an access point to which it is associated.

Figure 4:
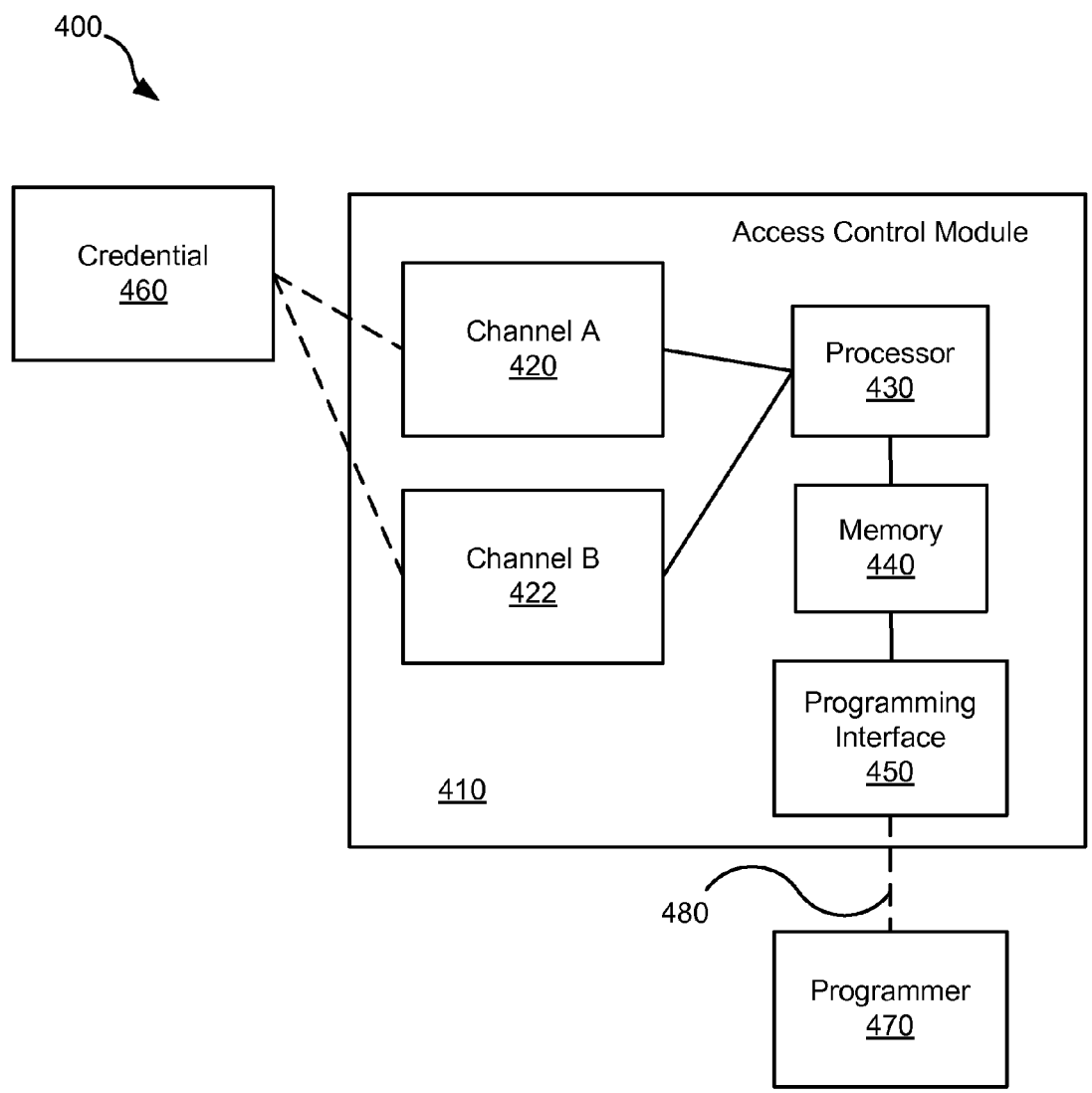
FIG. 4 illustrates another access control grouping in accordance with one or more embodiments of the present invention.

Turning to FIG. 4, an access control grouping 400 in accordance with various embodiments of the present invention is presented. Grouping 400 includes an access control module 410 capable of querying credentials 460 at different carrier frequencies. In this case, credential 460 is capable of operation at multiple carrier frequencies, and can thus communicate with access control module 410 via one or both of a channel A 420 or a channel B 422. In operation, credential 460 transmits information to access control module 410 via one access frequency. This information is received at a receiver that determines the carrier frequency at which credential 460 is transmitting. Where access control module 410 is capable of receiving at that frequency information from credential 460 is received, otherwise access control module 410 fails to acknowledge and credential 460 switches to another carrier frequency and the process is repeated until either no other carrier frequencies are supported by credential 460 or a mutually acceptable carrier frequency is identified.

Once the mutually acceptable carrier frequency is identified, a channel 420, 422 associated with the identified carrier frequency is selected. In either case, the selected channel 420, 422 receives the information and passes it to a processor 430 executing instructions maintained in a memory 440. Where the information is sufficient to authorize access, access control module 410 actuates an access point to which it is associated.

A programming interface 450 is also included in access control module 410. Programming interface 450 provides a vehicle for communicating updated instructions executable by the processor to memory 430. In addition, a programmer 470 is associated with access control group 400. Programmer 470 is capable of reading and writing memory 430 via programming interface 450. In one particular case, memory 440 is an EEPROM, and programmer 470 is an EEPROM reader/writer. In another particular case, memory 440 is a flash memory, and programmer 470 is a flash memory reader/writer. Further, a link 480 between programmer 470 and programming interface 450 may be wireless or wired. In some cases, link 480 is an infrared link and interface 450 via an infrared interface. Based on the disclosure provided herein, one of ordinary skill in the art will recognize a variety of interfaces and/or links that can be used in accordance with embodiments of the present invention. In some cases, programming interface 450 may be removably coupled to memory 440 or an interface thereto. Thus, a dongle may be attached to access control module 410 that allows for programming the module. In one or more cases, reprogramming access control module requires cycling power, while in other cases reprogramming can be achieved without cycling power.

Various embodiments of the present invention provide a contactless smart card access control reader that can easily be re-programmed in the field with firmware updates without removing access control module from its installed position on a wall or mullion. In some cases, this reprogramming can be achieved by removing an update portion of the access control module from a base portion of the same access control module to expose programming interface 450.

In some cases, programming interface 450 is associated with a communication adapter. This communications adapter may consist of a relatively small PCB that contains the following functionality: (1) an infrared interface, (2) several momentary switches, (3) a particular personality circuit, (4) and the circuitry associated with programming a microcontroller in the base assembly. As will be appreciated by one of ordinary skill in the art upon reading this disclosure, several possible structural and functional variations to the communications adapter exist. Some of these variations include, but are not limited to, a hardware programming, USB, serial or cellular phone interface. Any of these interfaces could be used through a personal digital assistant (PDA), or other portable computing device to program, load keys, download data or program the access control module in its installed position on a wall, mullion, or other hardware.

Figure 5A:
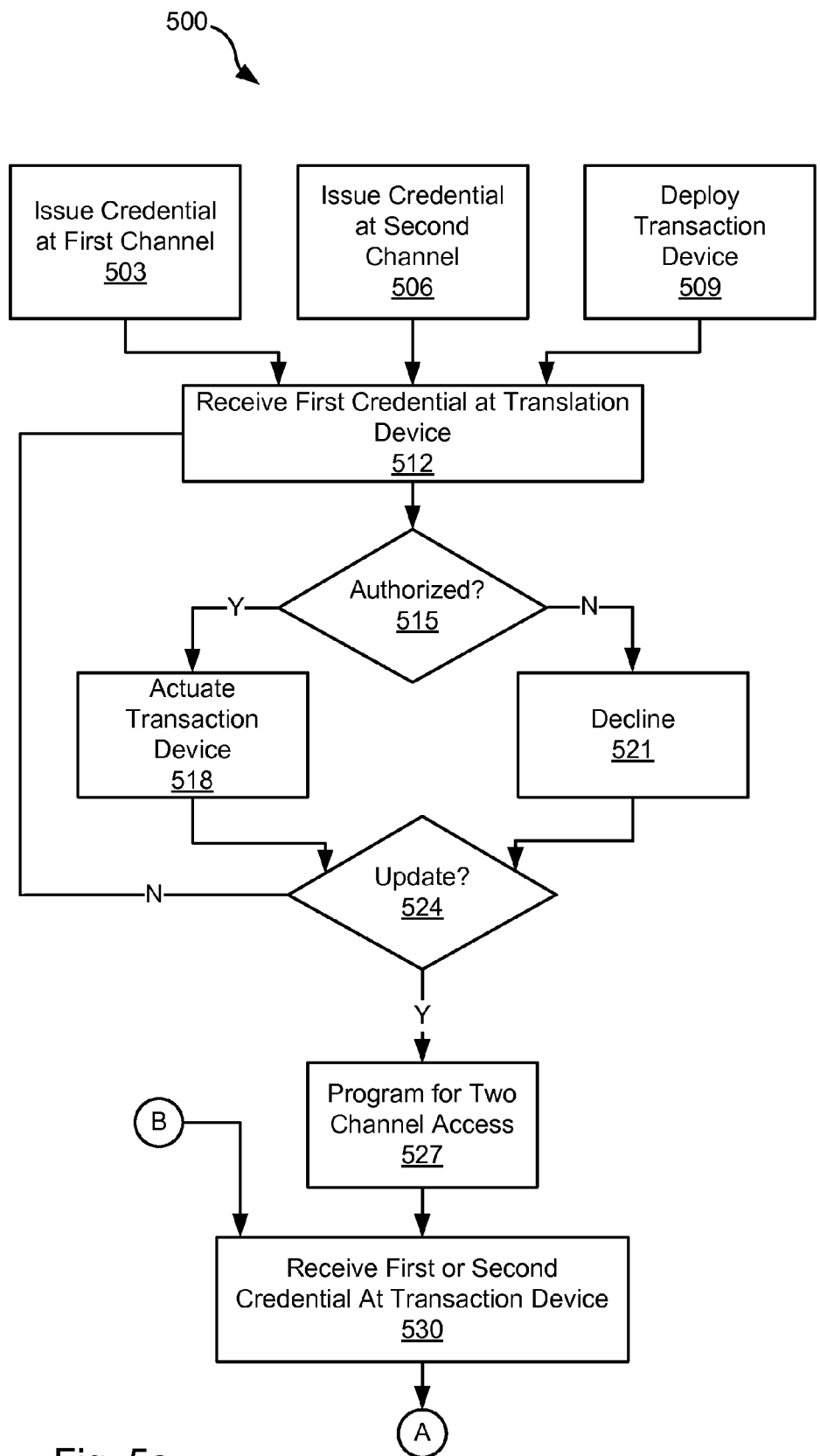
FIG. 5a is a first portion of a flow diagram illustrating a method in accordance with one or more embodiments of the present invention.
Figure 5B:
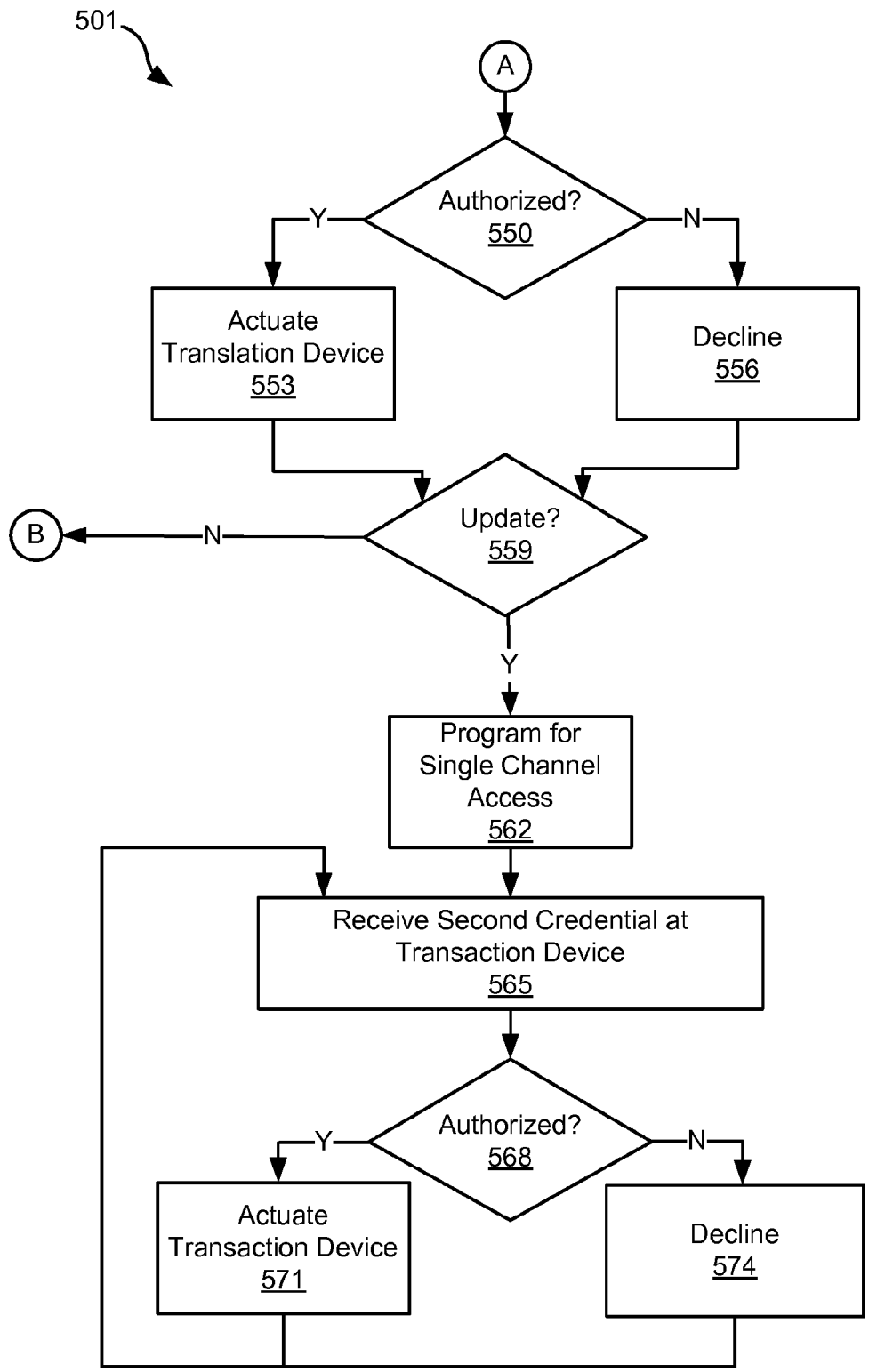

Turning to FIGS. 5a and 5b, flow diagrams 500, 501 illustrate a method in accordance with one or more embodiments of the present invention for performing a credential migration. Following flow diagram 500, credentials are issued that work on a first channel (block 503) and a second channel (block 506). In one case, the first credential is issued and is used for a substantial period of time before the second credential is issued. In such a scenario, the second credential may be issued to replace the first credential. In addition, a transaction device capable of reading one or both of the credentials via different channels is deployed (block 509). This deployment can include, but is not limited to, installing the transaction device at an access point. This transaction device can be, for example, an access control reader.

A user presents the first credential at the deployed transaction device and information from the first credential is transferred to the transaction device (block 512). As previously described, this information transfer can be achieved in a variety of ways including wired, wireless, magnetic stripe, and/or other ways. Thus, based on the disclosure provided herein, one of ordinary skill in the art will appreciate a myriad of ways in which information from the first credential can be passed to the transaction device. Next, the received information is utilized to determine if the credential is sufficient to actuate the transaction device (block 515). This can include, for example, determining if the information from the first credential is sufficient to allow access via an access point associated with the transaction device. Where the information is sufficient (block 515), the transaction device is actuated (block 518). Otherwise, the transaction device is not actuated and any request is declined (block 521).

It is then determined if the transaction device is to be updated (block 524). Thus, for example, it may be determined whether a software upgrade has been installed via a programming interface, whether a new update module has been installed that affects the operation of the transaction device, or the like. Where no update has occurred (block 524), the process of receiving only the first access credential is repeated (blocks 512-521).

Alternatively, where an update is to occur (block 524) and the update is to program the transaction device to operate on two channels, a program is received at the transaction device that enable operation on two different channels (block 527). As will be appreciated by one of ordinary skill in the art upon reading this disclosure, the program can be updated to the transaction device using one of a variety of approaches including, but not limited to, programming via a programming interface, or by changing update modules such that a different program is executed. Once this program is received and updated such that it is being executed by the transaction device, it is possible for the transaction device to operate in relation to both the first and second credentials (block 530).

Following flow diagram 501, it is determined whether a presented credential is authorized to actuate the transaction device (block 550). Again, this determination can be based on information provided from either the first credential or the second credential. Where the information from the presented credential is sufficient to actuate the transaction device (block 550), the transaction device is actuated (block 553). Otherwise, the transaction device is not actuated and any request is declined (block 556).

In addition, it is determined if the transaction device is to be updated (block 559). Thus, for example, it may be determined whether a software upgrade has been installed via a programming interface, whether a new update module has been installed that affects the operation of the transaction device, or the like. Where no update has occurred (block 559), the process of receiving information from both the first and second credentials is repeated (blocks 530-556).

Alternatively, where an update is to occur (block 559) and the update is to program the transaction device to operate on a single channel associated with the second credential, a program is received at the transaction device that enable operation on the appropriate channel (block 562). Again, as will be appreciated by one of ordinary skill in the art upon reading this disclosure, the program can be updated to the transaction device using one of a variety of approaches including, but not limited to, programming via a programming interface, or by changing update modules such that a different program is executed. Once this program is received and updated such that it is being executed by the transaction device, it is possible for the transaction device to operate in relation only to the second credential (block 565).

It is determined whether a presented second credential is authorized to actuate the transaction device (block 568). Again, this determination can be based on information provided from the second credential. Where the information from the presented credential is sufficient to actuate the transaction device (block 568), the transaction device is actuated (block 571). Otherwise, the transaction device is not actuated and any request is declined (block 574).

Figure 6:
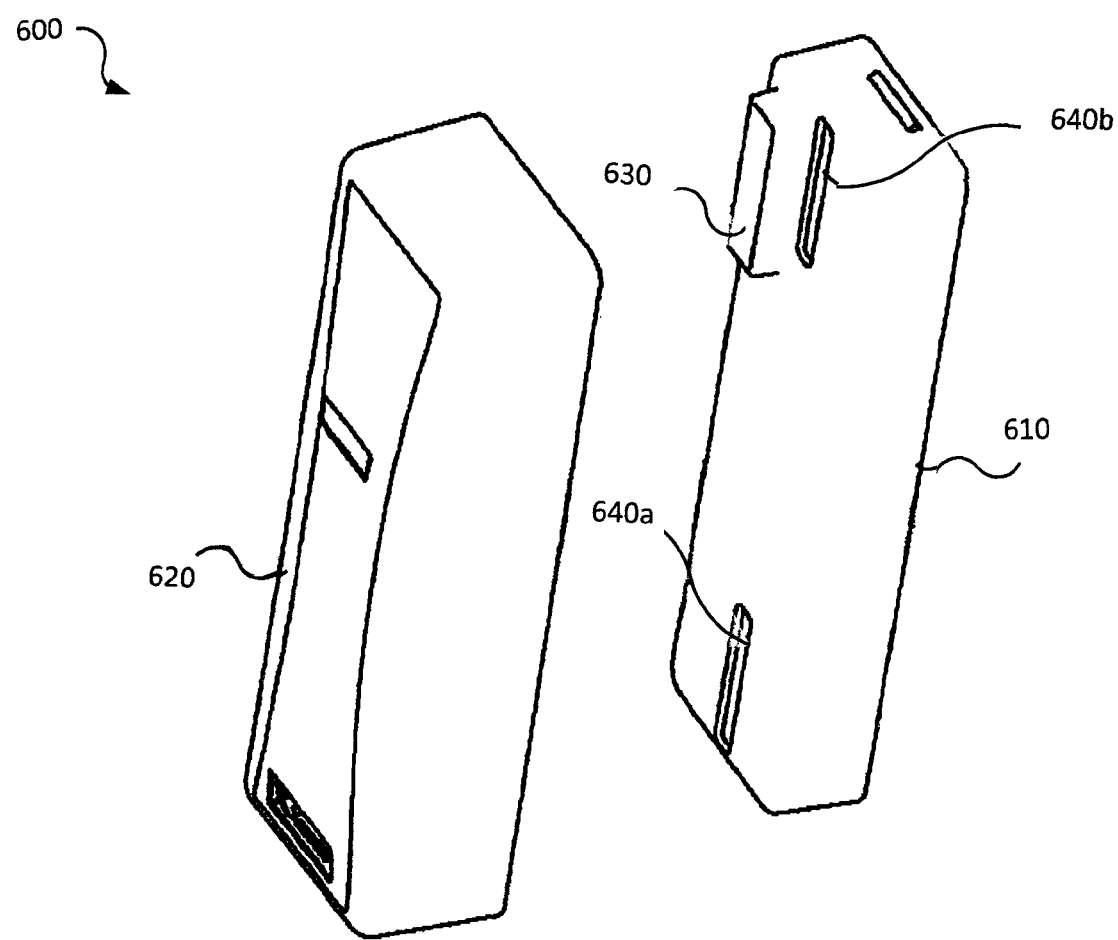
FIG. 6 is a modular access control device in accordance with one or more embodiments of the present invention.

Turning to FIG. 6, a modular access control device 600 in accordance with one or more embodiments of the present invention is illustrated. Modular access control device 600 includes a base portion 610 and an update portion 620. Base portion 610 includes mounting holes 640 and an electrical connector 630 that is matable to a corresponding electrical connector (not shown) an update portion 620. In operation, update portion 620 snaps onto base portion 610 that is mounted to a wall or other hardware. In this assembled configuration, electrical connector 630 is attached to the corresponding electrical connector on update portion 620. In some cases, update portion 620 snaps to base portion 610, while in other cases update portion 620 is screw mounted onto base portion 610. Based on the disclosure provided herein, one of ordinary skill in the art will appreciate a variety of methods for attaching update portion 620 to base portion 610.

Among various advantages, the modularity of modular access control device 600 facilitates a simple method for updating the functionality by replacing an existing update module with another update module. In some cases, this updating can be achieved without requiring any rewiring, total system replacement, and/or other costly procedures. In some cases, update module 620 includes a processor and computer readable medium, while in other cases it is limited to a selector contact that selects between software already loaded in a computer readable medium associated with base module 610. In one particular case, update portion 620 and base portion 610 each include a printed circuit board (PCB). The access control can be designed such that the PCB in update portion 620 and the PCB in base portion 610 are electrically coupled via electrical connector 630. In such a situation, the PCB (including components mounted thereon) associated with base portion 610 provide for a baseline functionality, and the PCB (including components mounted thereon) associated with update portion 620 provide for additional functionality. As one particular example, an update portion with only an infrared interface may be replaced by an update portion with both an infrared interface and a keypad interface. Several possible structural and functional variations to the base portion will be recognized by one of ordinary skill in the art based on the disclosure provided herein. These variations include, but are not limited to, any feature currently partitioned into the cover assembly. Examples of such variations include but are not limited to keypad, LCD, USB, CAN and/or TCPIP connectivity interface electronics. Also, several possible structural and functional variations to the cover assembly will be recognized by one of ordinary skill in the art based on the disclosure provided herein. These variations include, but are not limited to, any feature that may be integrated into a proximity access control reader. Examples of such variations include but are not limited to keypad, LCD, USB, CAN and/or TCPIP connectivity interface electronics. In addition, but again not limited to, it is also possible to include antennas, tuning networks, and appropriate RF reader electronics for other frequency reader systems including but not limited to 125 KHz, 433 MHz, 800 MHz, 900 MHz and/or 2400 MHz.

Various embodiments of the present invention include a personality detection system operable to detect what type of update portion is installed on the base portion, and to use this information to configure a processor associated with the base portion appropriately for the application. Further, some embodiments of the present invention provide a contactless smart card access control module that implements a tamper detection scheme capable of determining when the cover has been removed from the module. This tamper detection scheme can be configured to send a message to the host controller and/or sound an alarm at the access control module.

As just one of many examples illustrating advantages of one or more embodiments of the present invention, an access control module that that lacks keypad functionality is in service in the field. The user of the access control module decides that they would like to convert the reader from a non-keypad to a keypad reader. An installer or service technician is sent to the site where the reader is in use. The installer removes the update portion from the access control module and installs a new update portion that includes the keypad functionality. This process may or may not include using the communications adapter tore-flash the firmware in the reader. After the new update portion is installed on to the base portion, assembly, a processor associated with the access control module detects the new update portion in relation to the base portion and configures itself as a keypad installed access control module.

The processor then resets and begins the normal operation mode for the physical access control module. In an embodiment, this includes polling for two or more different types of transponders within the field of the reader. At a predetermined period, the processor turns on the RF interface, waits for the hardware to settle, either sends a poll or not depending on the type of transponder it is searching for, then checks the output of the receiver to determine if a transponder is in the field and responding. If a transponder is in the field and responding, the processor then carries out all of the steps to read or write the data from or to the transponder. Once this operation is completed, the processor formats the data appropriately and sends it to the host controller.

In addition to polling for a tag, the access control module can be configured to operate in a "pass-through" mode. In this mode, the access control module is controlled by a host computer through the serial port. The access control module simply performs any command the host controller sends to it and responds with the appropriate message according to the serial protocol for the access control module.

The access control module may also contain several other features such as LEDs and a beeper that can be controlled by the host controller through hardware lines or through the serial protocol. The hardware control lines are normally pulled-up in the reader and are active low. When the host pulls the line low, the processor detects this state and activates the appropriate feature as it is configured. These controls include but are not limited to green and red led and beeper. Another feature included in one or more embodiments of the present invention can be employed to extend the physical cable distance employed between the host and reader is the use of an analog to digital converter on the microcontroller to detect the host activation of a control line. Since long cable lengths can result in the host being unable to pull the line below the digital threshold on the processor I/O line, one or more embodiments of the present invention employ the use of an A/D channel in lieu of a digital I/O line. This allows the activation threshold for the control line to be programmable and configurable resulting in significantly longer cable runs between the host computer and reader to be successfully detected.

In one particular embodiment of the present invention, a contactless access control reader with a base portion and an update portion is provided. In this particular embodiment, and without limiting any previously described embodiments, the base portion includes a PCB potted into a piece of plastic which contains the following functionality: (1) the contactless card communications engine and security functions, (2) reader to host controller interface circuitry, and (3) the reader microcontroller and all associated functionality. The update portion includes a PCB potted into a piece of plastic which contains the following functionality: (1) one or more antennas and associated tuning circuits, (2) additional analog front end circuitry, (3) LEDs, and (4) a part of the personality detection scheme. The update portion may also include: (1) an infrared interface, (2) several momentary switches, and (3) the circuitry associated with programming a microcontroller in the base portion.

In another particular embodiment of the present invention a contactless smart card access control module that implements an automatic software-based addressing scheme via an RS-485 network, or some other network. This scheme could allow a group of modules on a network to be automatically assigned addresses when first connected to a new host controller. Addressing the modules through software simplifies the installation procedure as well as keeps the cost of the modules lower by eliminating the need for a hardware switch or switch bank in the reader. Additional embodiments of the present invention provide a contactless smart card access control module that can easily accept a communication adapter for the purpose of programming or configuring the reader. This communication adapter can be plugged into the base reader unit while it is still mounted in its service position on the wall or mullion. The communication adapter will include infrared communication capability so that a personal data assistant with an infrared interface can be used tore-flash, configure or load keys into the module.

In an installation scenario compatible with one or more embodiments of the present invention, the components and sub-components of an access control module are installed as follows. First, the base assembly is wired into the existing building wiring at the reader installation location and the base assembly is mounted to the wall or mullion using screws. The base assembly contains a male PCB interconnect header. This header is visible and accessible through an open window on the exposed front surface of the base assembly. Second, the back of the cover assembly is potted with a rectangular shaped cavity recessed into the potting. In this cavity, there is a mating female PCB interconnect header. The cover assembly is snapped onto the base assembly and during this process, the female connector in the cover assembly engages the male connector in the base assembly. This connector mating provides the interconnect of all of the circuits that are distributed between the base and cover assemblies. The communications adapter subassembly can be attached to the base assembly if the cover assembly is removed. The female header connector on the communications adapter board is the same as that found on the cover assembly PCB. Before installing or after removing the cover assembly, a technician can install the communications adapter by mating the connector on the communications adapter to the exposed connector on the base assembly.

The portable PDA or programmer assembly can then interact with the base assembly through the infrared port on the PDA. A program running on the PDA allows several operations with the electronics on the base PCB. These operations include but are not limited to configuration or reader behavior, loading keys to the reader, addressing the reader for an RS-485 bus, downloading data from the reader and flashing the reader with new firmware.

It should be noted that the aforementioned installation approach is limited to particular types of access control modules as disclosed herein, and that there are several alternative variations to the aforementioned approach useful based on the particular embodiment of access control module discussed herein. The variations may include, but are not limited to, repartitioning the electronics/functionality in any way to change the features that are included in the base, cover and communications adapter assemblies. For example, it may be possible to include all of the functionality on the communications adapter into the base assembly thus eliminating the need for the base assembly. Other potential variations include adding another operation frequency or protocol to the functionality of the reader.

In conclusion, the present invention provides novel systems, devices, methods and arrangements for facilitating credential emulation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for providing radio frequency identification access control, the method comprising:
   providing an access control module, wherein the access control module is capable of interacting at a first frequency and a second frequency;
   providing an access credential operable at the first frequency and at the second frequency;
   communicating data from the access credential to the access control module at the first frequency;
   determining within the access control module whether the data was communicated using the first frequency or the second frequency;
   wherein if the access control module is not capable of receiving at the first frequency, the method further comprises:
   communicating the data from the access credential to the access control module at the second frequency;

determining within the access control module the frequency at which the data was communicated;

granting access by the access control module to an access point if the data received is sufficient to authorize access.

2. The method of claim 1, wherein where the data is insufficient to authorize access, denying access by the access control module to the access point.

3. The method of claim 1, wherein the access control module is deployed locally to the access point.

4. The method of claim 1, wherein the first frequency is 125 KHz and the second frequency is 13.56 MHz.

5. The method of claim 1, wherein granting access by the access control module includes actuating a locking mechanism of a door.

6. The method of claim 1, wherein the access control module includes a base portion and a first update portion, and wherein the method further comprises updating the access control module by replacing the first update portion with a second update portion.

7. An access control system comprising:

an access credential operable to transmit data at a first frequency and a second frequency;

an access control module including a processor and a computer readable medium, wherein the computer readable medium includes instructions executable by the processor to:

determine the first frequency at which the data from the access credential is transmitted;

if the access control module is not capable of receiving at the first frequency, determine the second frequency at which the data from the access credential is transmitted; and where the data is sufficient to authorize access, grant access to an access point.

8. The access control system of claim 7, wherein the first frequency is 125 KHz and the second frequency is 13.56 MHz.

9. The access control system of claim 7, wherein the computer readable medium further includes instructions executable by the processor to deny access where the data is insufficient to authorize access.

10. The access control system of claim 7, wherein the access control module is deployed locally to the access point.

11. The access control system of claim 7, wherein the access point is a door.

12. The access control system of claim 7, wherein the access control module includes a base portion and a first update portion, and wherein the access control module is updatable by replacing the first update portion with a second update portion.

13. The access control system of claim 1, wherein if the access control module is capable of receiving at the first frequency, acknowledging receipt of the data to the access credential, and where the data received is sufficient to authorize access, granting access by the access control module to an access point based on the data received at the first frequency.

14. The access control system of claim 1, wherein if the access control module is capable of receiving at the second frequency, acknowledging receipt of the data to the access credential.

15. The access control system of claim 7, wherein if capable of receiving at the first frequency, the access control module acknowledges receipt of the data to the access credential.

16. The access control system of claim 7, wherein if capable of receiving at the second frequency, the access control module acknowledges receipt of the data to the access credential.

* * * * *